United States Patent [19]
Gebel

[11] 3,820,443
[45] June 28, 1974

[54] FLUID MEANS FOR LOCKING A MACHINE PART IN WORKING POSITION

[75] Inventor: Kurt M. Gebel, Waynesboro, Pa.

[73] Assignee: Landis Tool Company, Waynesboro, Pa.

[22] Filed: Aug. 20, 1969

[21] Appl. No.: 851,537

[52] U.S. Cl. .................................. 91/420, 91/447
[51] Int. Cl. ........................................ F15b 13/042
[58] Field of Search ..................... 91/420, 461, 447

[56] References Cited
UNITED STATES PATENTS

| | | | |
|---|---|---|---|
| 2,401,258 | 5/1946 | Livers | 91/420 X |
| 2,431,032 | 11/1947 | Ernst | 91/420 |
| 2,804,735 | 9/1957 | Comstock | 92/117 A |
| 3,071,926 | 1/1963 | Olson et al. | 91/420 |

FOREIGN PATENTS OR APPLICATIONS

| 449,876 | 7/1936 | Great Britain | 91/420 |
|---|---|---|---|

*Primary Examiner*—Irwin C. Cohen
*Attorney, Agent, or Firm*—Diller, Brown, Ramik & Wight

[57] ABSTRACT

This disclosure relates to a sliding element on a machine, particularly a machine tool, and more particularly, a tailstock for supporting a workpiece during a machining operation. During such a machining operation, the tailstock is subjected to momentary forces in excess and in opposition to the force normally required to hold the tailstock center in contact with the workpiece. The means for holding the tailstock positively against such forces is a body of hydraulic fluid applied to the tailstock center by means of a piston and cylinder. The pressure in the cylinder is only sufficient to hold the piston in contact with the tailstock center, but not sufficient to resist the momentary excessive forces. Such resistance is provided by locking the body of fluid against movement. This is accomplished by one check valve in a line through which fluid is supplied to the head end of the cylinder. Another connection is provided to the head end of the cylinder which includes a pilot-type check valve for preventing movement of the fluid out of the cylinder during the machining operation, but which may be opened when the tailstock center is retracted to discharge fluid from the head end of the cylinder direct to a reservoir without passing through a reversing or other control valve when the tailstock center is retracted. The pilot-type check valve is located as close as possible to the head end of the cylinder so that practically all of the fluid in the cylinder is discharged direct to the reservoir along with any accumulation of air.

6 Claims, 3 Drawing Figures

PATENTED JUN 28 1974 3,820,443

INVENTOR
KURT M. GEBEL

BY Diller, Brown, Ramik & Holt

ATTORNEYS

FLUID MEANS FOR LOCKING A MACHINE PART IN WORKING POSITION

This invention relates in general to new and useful improvements in hydraulic systems for machine components, and more particularly to a hydraulic system for holding a slidable member in a predetermined position against intermittent excessive loads. When a hydraulic motor or cylinder is used for this purpose, there is always the problem of yielding to such loads due to air being mixed with the hydraulic fluid which drives the motor.

If the hydraulically actuated member is a piston and cylinder with a reversing or other type control valve, the hydraulic fluid or oil in the head end of the cylinder may leak through the reversing valve in response to excessive loads on the piston thereof with the result that the slidable member is forced away from the predetermined position thereof.

Ordinarily, the matter of leakage can be solved by using a check valve, as is shown in U.S. Pat. No. 3,171,234, with particular reference to FIGS. 17 and 19 thereof, wherein the check valve supposedly prevents any reverse flow of fluid from the head end of the cylinder back to the reversing valve. However, a by-pass line around the check valve to permit reversal will also allow leakage through the reversing valve during the use of a machine component of which the slidable member is a part.

It will be readily apparent that means must be provided to discharge exhaust fluid and air from the head end of the cylinder, which means will also prevent leakage while the sliding member is being held in an operative or locked position. Fresh oil, free of air, is provided with each working stroke of the piston instead of the same body of oil moving back and forth between the cylinder and the control valve. Thus, there would be no accumulation of air in the cylinder, and as a result, the hydraulic fluid would be relatively rigid. However, when the cylinder is small, or the movement of the piston thereof is short, the volume of exhaust fluid is not sufficient to reach the point of discharge. The resultant operation of the piston and cylinder becomes unsatisfactory for many uses.

The problem of air in the oil is particularly critical where the operating cylinder is in a position on a machine remote from the control valve which directly controls the flow of hydraulic fluid to and from the cylinder. In such cases, the distance between the operating cylinder and the control valve is such that the hydraulic fluid is shifted back and forth in the line connecting the cylinder to the control valve. The hydraulic fluid in which the air has accumulated and on which the piston depends for movement is never discharged to the exhaust port of the control valve. Therefore, the air never leaves the hydraulic system.

It is, therefore, an object of this invention to provide means for preventing movement of the hydraulic motor from a selected position by momentary excessive loads.

Another object of this invention is to provide means to discharge trapped air from a hydraulic motor direct to exhausts without having to pass through a reversing or other control valve.

A further object of this invention is to provide control means whereby hydraulic fluid from a hydraulic motor or member is exhausted at a point close to the motor rather than through a remotely located control valve to prevent leakage and to avoid accumulating air in the cylinder thereof.

A still further object of this invention is to provide a direct connection from one side of a hydraulic motor to an exhaust line by means of a pilot-type check valve which is operable to permit the discharge of fluid from the motor when pressure is applied to the other side of the motor.

Yet another object of this invention is to permit low or normal hydraulic pressure to retain a workpiece in a fixed position as air in the hydraulic system is eliminated. For example, the tailstock of a machine tool may be so locked against any longitudinal forces during a machining operation.

In accordance with this invention, the solution to the above-set forth problem includes a pilot-type check valve and a reversing valve which directs fluid under constant pressure to the rod end of a cylinder. In a particular application of this invention, the cylinder is mounted on the tailstock of a machine tool to provide a lock against longitudinal movement of the tailstock work center which is caused by momentary excessive loads during a machining operation.

When the reversing valve directs fluid under pressure to the rod end of the cylinder, fluid is also directed to a piston of the pilot-type check valve which unseats the check valve member to permit the discharge of hydraulic fluid from the head end of the cylinder along with any air which may have accumulated in that end of the cylinder, and direct it to exhausts without having to pass through the reversing valve. Therefore, when fluid under constant pressure is directed by the reversing valve to the head end of the cylinder, both check valves serve to lock the piston and the associated tailstock center in the position to which they have been advanced.

With the above and other objects in view that will hereinafter appear, the nature of the invention will be more clearly understood by reference to the following detailed description, the appended claims and the several views illustrated in the accompanying drawing:

IN THE DRAWING

It is to be understood that this invention is applicable to any work or tool holding element in a machine tool where it is necessary to prevent movement of a member under intermittent loads during a machine operation while the workpiece and cutting tool are in operative engagement. However, for purposes of illustration only, the invention is specifically disclosed as applied to the tailstock of a cam grinding machine.

Figure 1:
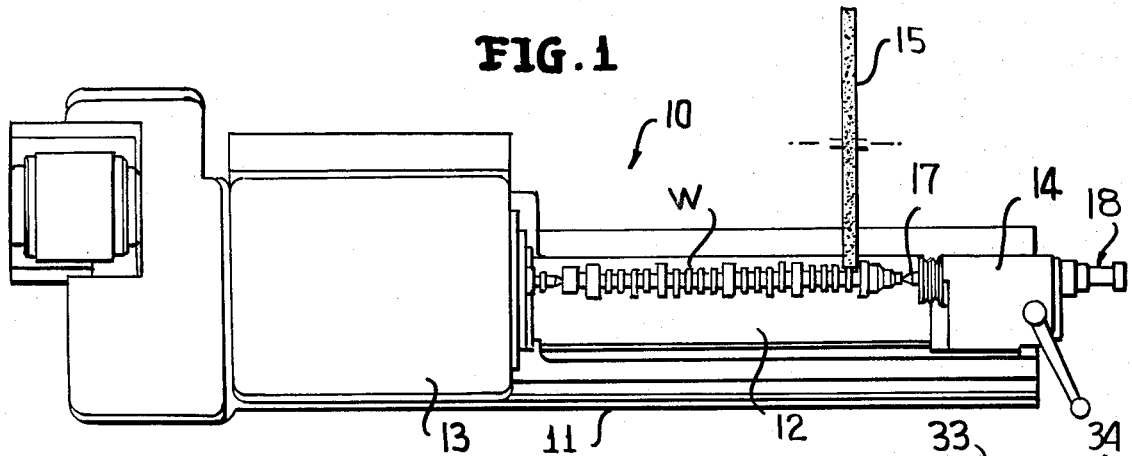
FIG. 1 is a plan view of a cam grinding machine having a tailstock work center which is locked in position by means of a hydraulic motor of the piston and cylinder type in accordance with this invention.

Referring now to the drawing in detail, there is illustrated in FIG. 1 a cam grinder which utilizes the hydraulic system of this invention, the cam grinder being generally referred to by the numeral 10 and including a base 11. The base 11 has mounted thereon for longitudinal movement a carriage 12 which supports a headstock 13 and an axially spaced tailstock 14.

The cam grinder 10 also includes a grinding wheel 15 having an axis which is disposed generally parallel to the axis of the work carriage 12 and which axis is shiftable towards and away from the axis of the work carriage 12 to control the diameter of the portion of the workpiece being ground.

Referring now to FIG. 1, it is to be noted that the tailstock 14 is slidably mounted on the carriage 12 and is held in a clamped relation to the headstock 13. A tailstock work center 17 is reciprocably mounted to support one end of a rotatable workpiece W which is driven by a conventional means on the headstock 13.

During the grinding operation, and particularly during the rough grinding operation, large intermittent forces on the workpiece W tend to shift the tailstock work center 17 longitudinally to the right. Means are provided to prevent this undesired movement by utilizing a hydraulic motor or cylinder 18, which includes a piston 19 (FIG. 2) connected to the hydraulic system to lock the tailstock work center 17 against movement by such forces on the workpiece.

Due to its inherent instability, a light workpiece has a tendency to bend under axial load and therefore, low pressure is used as it is undesirable to provide a holding pressure sufficient to oppose the maximum intermittent load.

Figure 2:
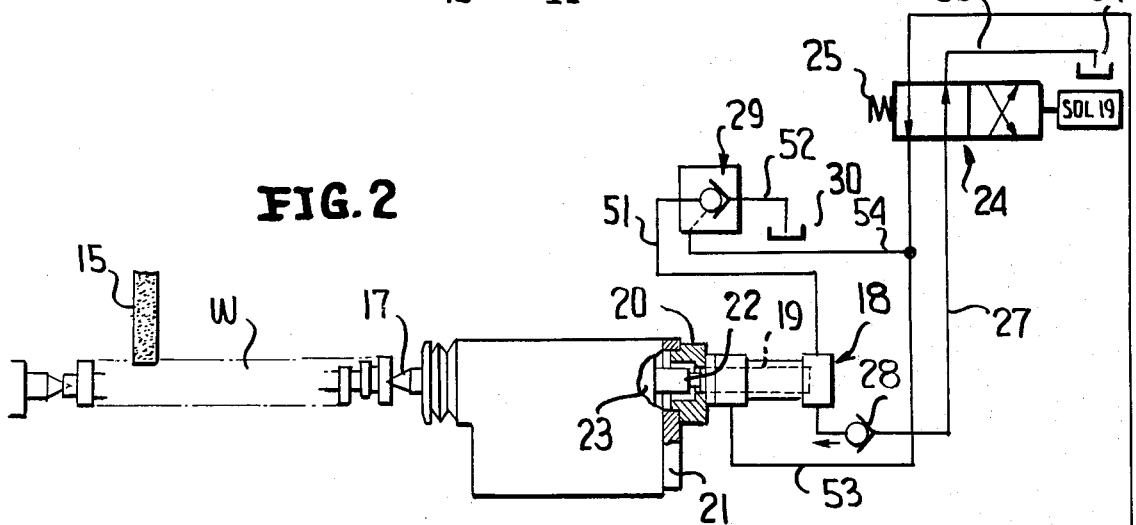
FIG. 2 is a schematic view showing the hydraulic means for operating the locking apparatus of the tailstock work center.

With particular reference to FIG. 2, the hydraulic motor 18 is secured to a support member 20 which, in turn, is secured to the tailstock 14 through an end plate 21 in a conventional manner. The piston 19 of the hydraulic cylinder 18 has an adapter 22 secured to the rod end thereof to provide a rigid contacting surface of hardened steel to contact a tailstock spindle 23 which houses the tailstock work center 17.

The piston 19 is advanced when a solenoid valve SOL19 is energized in a conventional manner to shift a control valve 24 to the left against the urging of a return spring 25 and hydraulic fluid under pressure is directed from line 26 to line 27 through a check valve 28 to the head end of the cylinder 18.

A pilot operated check valve 29 is mounted above and close to the head end of the hydraulic motor 18 and prevents movement of the tailstock center 17 to the right by locking a body of fluid which advances the piston 19 to enable the tailstock center 17 to resist the momentary excessive forces from the workpiece W during the grinding operation. The check valve 29 prevents any hydraulic leakage and provides additional stiffness to the hydraulic fluid of the system, as entrapped air bubbles are removed from the head end of the hydraulic motor 18 through the check valve 29 to a drain 30 when piston 19 is retracted at completion of the grinding operation. Air bubbles are, therefore, eliminated from the head end of the hydraulic motor 18 before the piston 19 is advanced which prevents any sponginess or minute movement of the tailstock center 17 when the machining pressure on the workpiece W is excessive.

At this time it is pointed out that hydraulic fluid under pressure is delivered to the line 26 from any source of hydraulic fluid under pressure although when the machine, such as the cam grinding machine 10, has a primary hydraulic fluid supply, the hydraulic fluid is delivered under pressure therefrom. When the primary supply of hydraulic fluid in the machine is relatively high, a pressure reducing valve 31 is coupled thereto, such as by way of a line 32 and the line 26 is coupled to the reducing valve 31 for receiving hydraulic fluid therefrom at a lower predetermined pressure.

It is also to be noted that the control valve 24 includes a return line 33 which is connected to a drain 34, the drain 34 preferably being the same as the drain 30.

Figure 3:
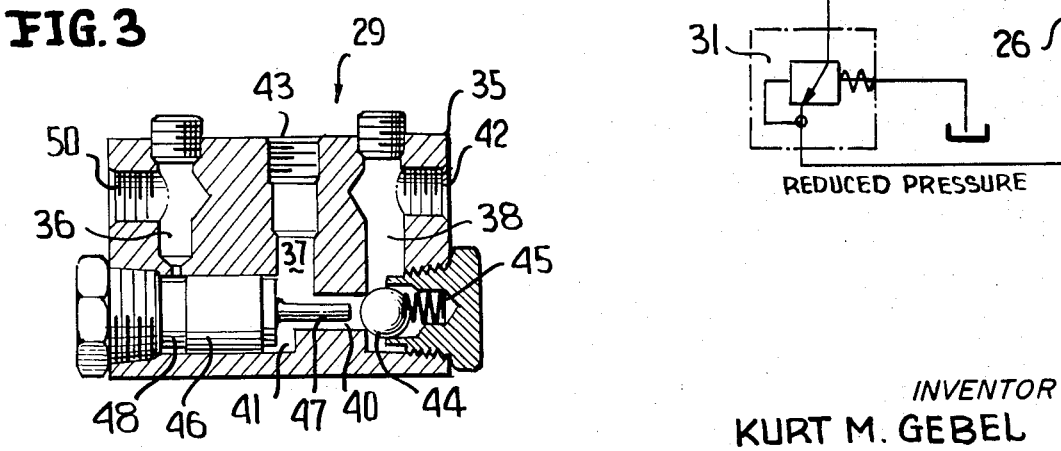
FIG. 3 is an enlarged sectional view through a pilot-type check valve in accordance with this invention.

The pilot-type check valve 29, as is shown in FIGS. 2 and 3, includes a housing 35 which is provided with three generally parallel passages 36, 37 and 38 formed therein. These three passages are interconnected generally by a transverse passage 40 of which a portion is in the form of a cylinder 41.

Flow between the passage 38 and the passage 40 is normally prevented by means of a ball type check member 44 which is held in passage closing position by a spring 45.

A piston 46 is mounted in the cylinder 41 of the passage 40, and has an extension 47 which is engageable with the check member 44 to move the same to the right, compressing the spring 45 and permitting freedom of fluid flow from the passage 38 into the passage 40 and to the exhaust port 43 through the passage 37. It is to be noted that fluid from the passage 36 may enter into the left end of the cylinder 41 about a reduced diameter portion 48 to the piston 46 so as to effect movement of the piston 46 to the right. A pilot port 50 opens into the passage 36 for delivering hydraulic fluid under pressure to the passage 36 and to the head end of the cylinder 41.

Referring once again to FIG. 2, it will be seen that the head end of the cylinder 18 is connected to the cylinder port of the check valve 29 by means of a line 51. A return line 52 is coupled to the exhaust port 43 and connects the same to the drain 30.

It is also to be noted that a line 53 extends from the control valve 24 to the rod end of the cylinder 18. A further line 54 is coupled to the line 53 and connects the same to the pilot port 50 of the check valve 29.

OPERATION

In the operation of the cam grinder 10, the tailstock work center 17 is locked to prevent any longitudinal movement of the workpiece W during the grinding operation. This movement is effected when solenoid SOL19 is energized in the customary manner during the operation of the cam grinder 10, shifting control valve 24 to the left. Hydraulic fluid at a pressure just sufficient to shift the tailstock work center 17 to engage and support the workpiece W is directed from the line 26 through the control valve 24 to the line 27 through check valve 28 to the head end of the cylinder 18. The piston 19 is advanced to the left to position the tailstock work center 17 into supporting engagement with the workpiece W. Hydraulic pressure from the rod end of the cylinder 18 is discharged through line 53 through the control valve 24 and line 33 to the drain 34.

During a grinding operation, movement of the tailstock work center 17 to the right by excess loads from the workpiece W, is prevented because the movement of fluid from cylinder 18 is prevented by check valves 28 and 29.

Following completion of a grinding operation, solenoid SOL19 is de-energized in the customary manner and control valve 24 is automatically returned to the right by the spring 25. Fluid pressure from reducing valve 31 through line 26 is now directed by the control valve 24 into the line 53 and to the rod end of the cylinder 18. At the same time, fluid under pressure is directed through the line 54 into the passage 36 and against the left end of the piston 46, moving the piston 46 to the right unseating the check member 44 whereby fluid from the head end of the cylinder 18 may exhaust through the line 51, check valve 29 and line 52 to the drain 30 permitting movement of the piston 19 to the right.

Accordingly, the piston 19 of hydraulic motor 18 is retracted while the fluid in the head end of the cylinder 18 is exhausted. This permits the free flow of fluid from the head end of the cylinder 18 with the result that entrained air is carried with the flowing hydraulic fluid and the hydraulic system provides fresh fluid free of air for the next operation.

It is to be understood that the check valve 29 is coupled almost directly to the head end of the cylinder 18 with the result that during each cycle of operation of the hydraulic cylinder 18, there is substantially a complete replacement of the hydraulic fluid within the head end of the cylinder. Accordingly, there can be no accumulation of air within the hydraulic cylinder 18 and the only hydraulic fluid which is directly affected during the operation of the cam grinder 10 is that trapped within the head end of the cylinder 18 and between the check valves 28 and 29.

Although only a preferred embodiment of the hydraulic system has been specifically illustrated and described herein, it is to be understood that minor variations may be made therein without departing from the spirit of the invention.

I claim:

1. In a machine tool, means for locking a machine part in a working position,
   a. a double acting hydraulically actuated member having a head end and a rod end,
   b. a control valve adapted to be connected to both a source of hydraulic fluid under pressure and a drain,
   c. a first conduit connecting the head end of said hydraulically actuated member to said control valve for selectively delivering hydraulic fluid under pressure to the head end of said hydraulic actuated member,
   d. a first check valve mounted in said first conduit adjacent said hydraulically actuated member,
   e. a second conduit connecting the head end of said hydraulically actuated member to a drain for facilitating the discharge of trapped air and hydraulic fluid from the head end of said hydraulically actuated member,
   f. a second check valve mounted in said second conduit adjacent said hydraulically actuated member, said second check valve being of the pilot type,
   g. a third conduit connecting the rod end of said hydraulically actuated member to said control valve,
   h. said pilot-type check valve having a pilot port, and
   i. a fourth conduit connecting said pilot port to said third conduit for unseating said pilot-type check valve when hydraulic fluid under pressure is directed to the rod end of said hydraulically actuated member thereby facilitating the discharge of hydraulic fluid and air from the head end of said hydraulically actuated member to a drain,
   j. said hydraulically actuated member including a piston and cylinder,
   k. said control valve being operative to connect pressure alternately to each end of said cylinder to advance or retract said piston,
   l. said control valve being so remotely located with respect to said cylinder so that any mixture of hydraulic fluid and air in said cylinder would never be discharged to exhaust through said control valve,
   m. said first check valve being oriented in a manner wherein fluid under pressure is permitted to flow through said first conduit only towards the said cylinder, and
   n. means to shift said control valve to direct fluid under pressure to the rod end of said cylinder to retract said piston and to actuate said pilot type check valve permitting fluid and trapped air to be discharged from the head end of said cylinder.

2. The machine tool of claim 1 wherein the source of fluid under pressure is substantially free from air and is selectively supplied to the head and rod end of the said cylinder to effect each movement of said piston as controlled by the said control valve.

3. In a machine tool, means for shifting a machine part and locking the same in a selected working position comprising:
   a. a double acting hydraulically actuated member having a head end and a rod end,
   b. a control valve having means for connection to both a source of hydraulic fluid under pressure and a drain,
   c. a first conduit connecting the head end of said hydraulically actuated member to said control valve for selectively delivering hydraulic fluid under pressure to the head end of said hydraulically actuated member to move the machine part to the selected working position,
   d. a second conduit connecting the rod end of said hydraulically actuated member to said control for selectively venting the rod end and for applying a hydraulic force thereto for retracting the machine part from the selected working position,
   e. said control valve of necessity due to the machine tool construction being spaced remotely from said hydraulically actuated member a distance wherein during the normal operation of said hydraulically operated member to position the machine part hydraulic fluid from within said hydraulically actuated member would normally primarily shift back and forth within said first and second conduits and air from within the hydraulic fluid would normally accumulate within said hydraulically actuated member and said first and second conduits,
   f. said means for locking the machine part in a selected working position further comprising means for preventing the normal accumulation of air in said hydraulically actuated member and said first and second conduits including
   g. a first check valve in said first conduit for preventing the return flow of hydraulic fluid from the head end of said hydraulically actuated member to the drain,
   h. a third conduit separate and apart from said first conduit for connecting the head end of said hydraulically actuated member to a drain whereby upon each operation of said hydraulically actuated member hydraulic fluid in the head end thereof is replaced and accumulation of air therein is prevented, i. a normally closed pressure operated valve incorporated in said third conduit closely adjacent the head end of said hydraulically actuated member for controlling the flow of hydraulic fluid through said third conduit to the associated drain, j. and a fourth conduit connecting said pressure operated valve to said second conduit for opening said pressure operated valve in response to the supplying of hydraulic fluid to the rod end of said hydraulically actuated member and effecting a drainage of hydraulic fluid displaced from the head end of said hydraulically actuated member together with air that may have accumulated therein.

4. The machine tool of claim 3 wherein said pilot-type check valve includes a. a ball check member which is seated against an exhaust port to prevent flow from said hydraulic actuated member through said pilot-type check valve through a cylinder port thereof, and b. a piston which is advanced by fluid under pressure directed to said pilot port to unseat the ball check member and connect said cylinder port to said exhaust port.

5. The machine tool of claim 3 wherein a. said means for locking a machine part in a working position includes means to lock a machine part against movement, b. and said hydraulically actuated member is of the piston and cylinder type with said machine part being coupled to said hydraulically actuated member for movement thereof.

6. The machine tool of claim 3 wherein a. said normally closed pressure operated valve is of a pilot-type and b. includes a check valve and c. a pilot port connected to said second conduit.

* * * * *